E. L. WILSON.
SPEAKING TELEPHONE.

No. 250,616. Patented Dec. 6, 1881.

Witnesses:
W. W. Swan
H. G. Olmsted

Inventor:
Edward L. Wilson

UNITED STATES PATENT OFFICE.

EDWARD L. WILSON, OF BOSTON, MASSACHUSETTS, ASSIGNOR TO THE AMERICAN BELL TELEPHONE COMPANY, OF SAME PLACE.

SPEAKING-TELEPHONE.

SPECIFICATION forming part of Letters Patent No. 250,616, dated December 6, 1881.

Application filed May 21, 1879.

*To all whom it may concern:*

Be it known that I, EDWARD L. WILSON, of Boston, in the State of Massachusetts, have invented an Improvement in Speaking-Telephones, of which the following is a specification.

The invention relates to the diaphragm or vibrating plate of the speaking-telephone; and it consists in a modification of the cushion of that member of the instrument.

Heretofore it has been customary to interpose between the diaphragm and its bed or frame a rubber ring, or a ring of blotting-paper, or similar elastic non-conducting substance, and sometimes a similar ring has also been applied to the diaphragm on the side opposite the bed; but this has left uncovered the edge proper of the diaphragm. I have found that better results are obtained by covering also this edge; and for this purpose I make use of a rubber band the internal diameter of which, when not stretched, is less than that of the diaphragm. This band is stretched over the edge of the diaphragm, so as to form what may be termed a "binding" for it, covering the edge proper, and extending upon both faces from the edge toward the center for the distance of about a quarter of an inch. The band should be small enough to exert in a small degree a pressure toward the center of the diaphragm, so as to render the diaphragm slightly concavo-convex.

It will be found that by the application of an elastic band to the diaphragm certain troublesome overtones are avoided which are present when the edge proper is left bare.

Figure 2:
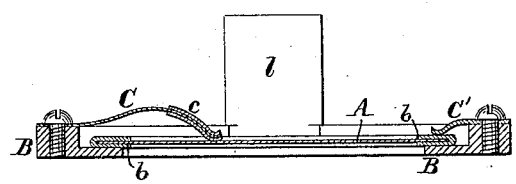
Figure 1:
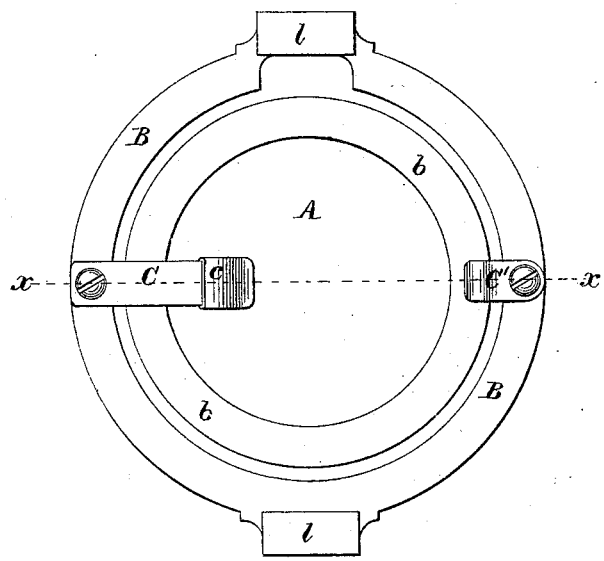

In the drawings, Figure 1 is a front elevation of the diaphragm resting in its bed, and Fig. 2 is a section on dotted line $x\ x$ of Fig. 1.

A is the diaphragm. B is the metallic ring or frame for supporting the diaphragm and other mechanism of the telephone, the diaphragm resting on a lip or ledge of the ring B, as shown, and the other mechanism (not shown) being supported by two ears, $l\ l$, projecting from the ring. The band of rubber or similar material, applied as above described, is marked $b$.

C is a spring, and C' a clamp attached to the metal ring or frame B and holding the diaphragm in place. The free end of the spring C is coated with rubber $c$, while the free end of clamp C' presses against the rubber band $b$; but this method of holding the diaphragm in place by springs and clamps forms no part of my invention, for I believe the same to have been invented by Francis Blake, Jr., who, I am informed, has applied for Letters Patent therefor.

I claim—

A band of rubber or other similar elastic material applied to the diaphragm of a telephone, substantially as described, to cover the edge and lap over upon both faces, for the purpose specified.

EDWARD L. WILSON.

Witnesses:
W. W. SWAN,
H. G. OLMSTED.